US012724826B2

(12) United States Patent
Johnson et al.

(10) Patent No.: US 12,724,826 B2
(45) Date of Patent: Sep. 1, 2026

(54) SYSTEMS AND METHODS FOR GENERATING A KNOWLEDGE GRAPH INCLUDING INTERACTION INFORMATION

(71) Applicant: Lighty AI, Inc., Newton, MA (US)

(72) Inventors: Anthony Morris Johnson, Boulder, CO (US); Michaela Kindler, Atherton, CA (US); Richard R. Rabbat, Newton, MA (US)

(73) Assignee: Lighty AI, Inc., Newton, MA (US)

( * ) Notice: Subject to any disclaimer, the term of this patent is extended or adjusted under 35 U.S.C. 154(b) by 0 days.

(21) Appl. No.: 19/041,932

(22) Filed: Jan. 30, 2025

(65) Prior Publication Data

US 2026/0220201 A1 Jul. 30, 2026

(51) Int. Cl.
*G06F 16/901* (2019.01)
*G06F 16/28* (2019.01)
*G06Q 10/0631* (2023.01)

(52) U.S. Cl.
CPC ........ *G06F 16/9024* (2019.01); *G06F 16/285* (2019.01); *G06Q 10/06313* (2013.01)

(58) Field of Classification Search
CPC .............. G06F 16/9024; G06F 16/285; G06Q 10/06313
See application file for complete search history.

(56) References Cited

U.S. PATENT DOCUMENTS 12,556,658 B2 * 2/2026 Grillo .................. G06Q 10/101
12,581,037 B2 * 3/2026 Grillo .................. G06Q 10/101
2021/0026846 A1 * 1/2021 Subramanya ......... G06F 16/289
2022/0043826 A1 2/2022 Zorin et al.
2023/0409615 A1 12/2023 Khemka et al.
2024/0403086 A1 * 12/2024 Mancuso .............. G06N 3/042
2025/0077851 A1 3/2025 Garapati et al.
2025/0094926 A1 * 3/2025 Solonko ............... G06F 16/335
2025/0181424 A1 6/2025 Klingler et al.
2025/0225587 A1 7/2025 La Placa
2025/0278572 A1 9/2025 Morato et al.
2025/0342446 A1 11/2025 Mancuso et al.

* cited by examiner

*Primary Examiner* — Debbie M Le

(57) ABSTRACT

In a computer-implemented method for generating a knowledge graph of interaction information, a data item including an interaction between at least two entities is received. A knowledge tuple for the data item is generated, the knowledge tuple including entities of the data item and a topic of the interaction of the data item. At least one thread to which the data item corresponds is identified, wherein a thread includes connected data items. An interaction tuple for the data item is generated, the interaction tuple including the entities of the data item, the thread corresponding to the data item, and a type of interaction of the data item. The knowledge graph is populated with the knowledge tuple and the interaction tuple, the knowledge graph including nodes associated with the entities, the topics, and the interactions, wherein the nodes associated with interactions include the type of interaction and thread of the data item.

15 Claims, 10 Drawing Sheets

SYSTEMS AND METHODS FOR GENERATING A KNOWLEDGE GRAPH INCLUDING INTERACTION INFORMATION

BACKGROUND

Performing various tasks, such as scheduling meetings, particularly for multiple entities within an enterprise environment, can be cumbersome. Often, multiple emails and lengthy exchanges may be required to coordinate scheduling of a meeting or planning of an event, depending on the number of participants and the nature of the meeting. Additional factors may complicate the scheduling process, such as the respective roles of the participants, the communication practices and preferences of the participants, and other factors that are personal to the participants.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Figure 1:
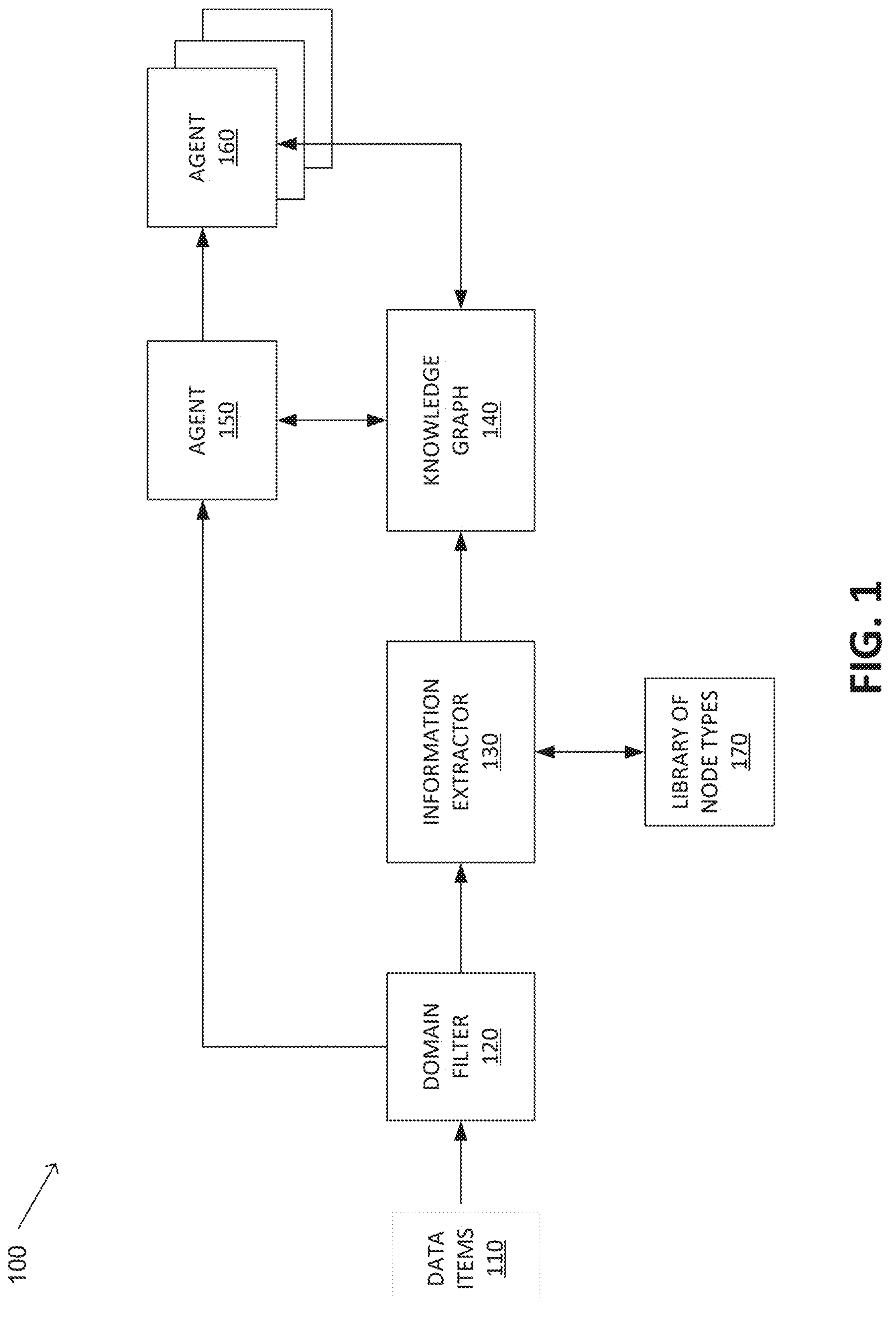
FIG. 1 is a block diagram illustrating a system for generating and accessing a knowledge graph including interaction information, in accordance with embodiments.

Reference will now be made in detail to various embodiments of the subject matter, examples of which are illustrated in the accompanying drawings. While various embodiments are discussed herein, it will be understood that they are not intended to be limited to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments. As denoted elsewhere herein, like element numbers are intended to indicate like elements or features.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "executing," "identifying," "extracting," "generating," "evaluating," "determining," "applying," "instantiating," "effectuating," "storing," "communicating," "identifying," "classifying," "populating," "filtering," "forwarding," "prompting," "collapsing," or the like, refer to the actions and processes of an electronic computing device or system such as: a host processor, a processor, a memory, a cloud-computing environment, a software defined network (SDN) manager, a system manager, a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein provide systems and methods for facilitating interaction between multiple participants. For instance, scheduling meetings or collaborating on projects, particularly for multiple entities (e.g., employees or groups) within an enterprise environment, can be cumbersome. Often, multiple emails or other forms of electronic communication (e.g., direct messages, instant messages, etc.) may be required to coordinate scheduling of a meeting, depending on the number of participants and the nature of the meeting. Additional factors may complicate the scheduling process, such as the respective roles of the participants, the communication practices and preferences of the participants, and other factors that are personal to the participants.

In some situations, an executive assistant or other type of administrative professional is tasked with the responsibility of scheduling such meetings. The use of such personnel in scheduling meetings can vary according to the skill set of the individual, and their ability to intuit the requirements of the participants. Further complicating matters is that such personnel often move in and out of positions, and maintaining consistent practices for meeting scheduling and related communications is inconsistent at best.

Embodiments described herein provide a solution for performing various tasks, such as scheduling of meetings, in an automated fashion using artificial intelligence (AI). The described embodiments access communication data and calendar data for individuals and/or enterprises, and utilize the communication data and calendar data to identify patterns and preferences for accomplishing these tasks. Large language models (LLMs) are used to perform various domain-specific tasks, and can be trained and tuned to perform these tasks. Knowledge graphs are generated and populated with information describing the interactions between entities (e.g., within an enterprise), where the interactions can include communication between the entities, such as threads of communication between the entities.

An agent employing at least one LLM can generate prompts to access and search the appropriate knowledge graph to identify how to solve a particular problem, such as scheduling a meeting. For example, the agent can use information extracted from the knowledge graph to generate or effectuate the generation of electronic messages that are sent to the intended participants automatically, where the messages are based in part on prior communications between at least one participant in scheduling meetings. The described embodiments provide a holistic approach to performing tasks, such as meeting scheduling, by performing such tasks in a manner consistent with how the participants and/or enterprise typically handle such tasks.

In accordance with various embodiments, systems and methods for generating a knowledge graph of interaction information are provided. A plurality of data items is received, where a data item of the plurality of data items comprising an interaction between at least two entities. Examples of data items include, without limitation, emails, other electronic communications, calendar events, and shared documents that are accessible for collaboration. The plurality of data items can be received for one or more users, groups of users, and/or for an enterprise.

In some embodiments, the data items are analyzed for populating a knowledge graph having a specific domain. For example, the domain of the knowledge graph can be one of, without limitation, scheduling, sales, strategic planning, forecasting, project management, product management, engineering management, etc. In some embodiments, at least one domain of each data item of the plurality of data items is identified. Data items that do not correspond to the domain of the knowledge graph are filtered out, such that data items not corresponding to the domain of the knowledge graph are disregarded. As such, domain-specific knowledge graphs can be generated for each domain. It should be appreciated that a data item can correspond to one or more domains. In some embodiments, an LLM is prompted to determine a domain or domains of the data item and determine whether to forward the data item for data extraction or to which system component to forward the data item for data extraction.

A knowledge tuple is generated for each data item of the plurality of data items, where the knowledge tuple includes entities of the data item and a topic of the interaction of the data item. In some embodiments, a relationship between the entities is also determined, where the relationship identifies that the entities are in communication over the topic. In some embodiments, the knowledge tuple from each data item is generated at an LLM in response to prompting the LLM to extract the knowledge tuple information from the data item.

Threads of the plurality of data items are identified, wherein a thread comprises connected data items of the plurality of data items. For example, a thread can be a collection of electronic messages between two or more entities in an exchange, e.g., regarding the scheduling of a meeting. The data items of the plurality of data items are classified according to a type of interaction of the data item. In some embodiments, the type of interaction is selected from a library of node types. In some embodiments, the library of node types is based on a domain of the knowledge graph.

An interaction tuple for the data items of the plurality of data items is generated, where the interaction tuple includes the entities of the data item, the thread corresponding to the data item, and the type of interaction of the data item. The interaction tuple adds context to the plurality of data items, providing additional information for use in identifying patterns based on the interactions between entities. In some embodiments, the interaction tuple from each data item is generated at an LLM in response to prompting the LLM to extract the interaction tuple information from the data item.

In accordance with various embodiments, LLMs are used to perform the extraction of information from the data items for generating the knowledge tuples and the interaction tuples. In some embodiments, the LLMs are fine-tuned for performing the specific tasks of information extraction. For example, an LLM can be fine-tuned to extract the entities of the data item and a topic of the interaction of the data item in generating the knowledge tuple. Similarly, an LLM can be fine-tuned to extract the interaction information from the data item in generating the interaction tuple. In some embodiments, the LLMs are trained on a corpus of historical data items illustrative of the type of information extraction used for generating the knowledge tuple and the interaction tuple.

The knowledge graph is populated with the knowledge tuple and the interaction tuple, where the knowledge graph includes nodes associated with the entities, the topics, and the interactions, and where the nodes associated with interactions comprise the type of interaction and thread of the data item. The knowledge graph with interaction information allows an agent to search for contextual communication patterns for use in performing specified tasks or actions. It should be appreciated that the described system may include multiple knowledge graphs, each associated with a particular domain. The domain-specific knowledge graphs are accessible for assisting in the performance of domain-specific tasks. The nodes and edges of the knowledge graph provide a workflow database of historical interactions of entities comprised within the knowledge graph, allowing for the retrieval of subgraphs of the knowledge graph as examples of interactions for use in automatically effectuating an action.

In accordance with other embodiments, a first agent including an LLM is configured for evaluating data items and automatically effectuating actions by accessing the knowledge graph including interaction information. In some embodiments, the LLM is fine-tuned to perform the specific task (e.g., scheduling). The first agent receives an indication to perform a task. In some embodiments, the first agent receives an overt command to perform the task, e.g., a request to schedule a meeting regarding a particular topic with a list of participants. In other embodiments, the first agent receives a communication data item, parses the data item, determines that an action should be taken, and determines a second agent for effectuating the action. For example, the agent receives an email and identifies a need to schedule a meeting regarding a particular topic with a list of participants. The first agent, using the LLM, determines what information would be useful in effectuating the scheduling of the meeting, generates a query to the knowledge graph for the information, identifies a second agent (e.g., a scheduling agent) for effectuating the scheduling, forwards the retrieved information to the second agent, which automatically commences with scheduling such a meeting. In some embodiments, the first agent may receive communication data items and determines whether an action needs to be effectuated (e.g., is the communication data item relevant to the domain of the first agent).

The LLM of the first agent is directed via prompts to identify and effectuate the associated task. The first agent generates a query (e.g., at a query engine) related to the task for accessing information related to the task from the associated knowledge graph. For example, the query engine generates prompts to return information from the knowledge graph that identifies entities involved in the task, information about the process for performing the task for these entities, as well as data items (e.g., communications) related to performing the task. The information received from the knowledge graph is placed in a context window that is exposed to the LLM. In some embodiments, the information received includes subgraphs of the knowledge graph, where a subgraph is indicative of a previous instance of performing the same or similar task. The first agent, using the LLM, can run any number of queries to retrieve the needed information from the knowledge graph.

The LLM of the first agent identifies a second agent for effectuating performance of the indicated task. For example, where the task to be performed is to schedule a meeting, the context window could include information about how the participants have scheduled meetings in the past, how the enterprise has schedule meetings in the past, and information about the topic and participants of the meeting. The first agent communicates the information retrieved from the knowledge graph and forwards the information to the identified second agent for effectuating the task. It should be appreciated that there can be a plurality of second agents that are configured to effectuate different tasks or action. For example, a second agent can be an agent for performing scheduling of a meeting, planning, coding, updating of documentation (e.g., standard operating procedures), etc.

The second agent includes an LLM for effectuating the identified action. The LLM is prompted by the second agent to evaluate the information received from the first agent to determine what action to effectuate and how to effectuate the action (e.g., by utilizing a subgraph and/or example interactions identified by the knowledge graph). For example, where the second agent is a scheduling agent, the LLM would then generate and communicate an email to the intended participants about scheduling a meeting, including a proposed time. Other information could also be provided, such as a document to be discussed in the meeting, an agenda of the meeting, etc., as indicated in the communications related to the scheduling of the meeting. The first agent would receive follow-up emails regarding the scheduling of the meeting, and iterate as necessary to schedule such a meeting.

In accordance with some embodiments, the second agent is comprised within a graph of agents, wherein the graph of agents identifies multiple agents that collectively are available for evaluating the information received from the first agent to determine the action and for effectuating the action under control of the second agent. For instance, where the second agent is dedicated to scheduling meetings, the second agent might have access to a calendar of only one entity involved in the meeting. The second agent might identify a meeting time available to that entity, then engage another agent (e.g., a messaging agent) for communicating (e.g., generating an email) with the other entity of the meeting to suggest the meeting time. In another example, where the second agent has access to the calendars of all entities, the second agent might find a mutually available time and set the meeting without needing to engage a messaging agent.

As described herein, the various embodiments provide systems for automatically performing tasks by utilizing LLMs to generate knowledge graphs based on communication and calendar information, and utilizing an LLM to access the knowledge graph including interaction information and retrieve information from the knowledge graph needed to perform the task.

Hence, the embodiments of the present invention greatly extend beyond conventional methods of generating and using knowledge graphs. For instance, the described embodiments generate knowledge graphs including interaction information for data items, connecting data items of interactions, and storing that information along with the knowledge tuple in the knowledge graph. The knowledge graph can then be accessed in coordination with an LLM to extract information including the interaction information for use in performing one or more tasks. This utilization of interaction information within a knowledge graph improves the performance of automatic task performance by an LLM, such as scheduling. Accordingly, embodiments of the present invention amount to significantly more than merely generating and using knowledge graphs. Instead, embodiments of the present invention specifically recite novel processes, rooted in computer technology, for generating knowledge graphs including interaction information that connects related data items and uses such a knowledge graph including interaction information to perform tasks using a domain-specific LLM, allowing for the automation of various tasks to improve the performance of task automation.

Example System for Generating and Using a Knowledge Graph of Interaction Information Example embodiments described herein provide methods and systems for generating and using knowledge graphs that include information related to interactions between entities. In some embodiments, knowledge graphs are generated based on communication and calendar data (collectively referred to herein as "data items") of individuals, where the information extracted from the collected data utilizes large language models (LLM), where at least one LLM is configured to perform classification of interactions based on the collected data items. At runtime, in accordance with various embodiments, an agent including an LLM is configured to automatically perform a task by querying the knowledge graph for information needed to perform the task, where the retrieved information informs the performance of the task based at least in part on interactions between various entities. For instance, the agent can perform a task based on historical examples of how such a task was performed in the past based on identified patterns. In this way, the described embodiments facilitate the automatic execution of tasks using LLMs based on the knowledge graph including interaction information between entities.

FIG. 1 is a block diagram illustrating system 100 for generating and accessing a knowledge graph including interaction information, in accordance with embodiments. System 100 includes information extractor 130, knowledge graph 140, agent 150, at least one agent 160, and library of interaction types 170. In some embodiments, system 100 also includes domain filter 120. It should be appreciated that domain filter 120, extractor 130, knowledge graph 140, agent 150, agent(s) 160, and library of interaction types 170, can be under the control of a single component of an enterprise computing environment (e.g., a distributed computer system or computer system 700) or can be distributed over multiple components (e.g., a virtualization infrastructure or a cloud-based infrastructure). In some embodiments, system 100 is comprised within or is an enterprise system.

Data items 110 are received at system 100, where data items 110 include communication data and calendar data. Example of communication data include, without limitation, emails, chats, direct messages, instant messages, electronic messages, shared documents that are accessible for collaboration (e.g., documents that track shared edits and comments), and other forms of electronic communication, including messages of proprietary messaging systems (e.g., Slack, Microsoft Teams, Discord, etc.) Calendar data can include, without limitation, meetings, appointments, and scheduling data that are maintained electronically (e.g., Google Calendar, Outlook, etc.) It should be appreciated that data items 110 can include any communication and calendar data maintained and accessible in an electronic format.

In some embodiments, data items 110 are received at domain filter 120 of system 100. For instance, an enterprise may maintain multiple knowledge graphs for performing actions in multiple respective domains. Domains may include, without limitation, a scheduling domain, a planning domain, a forecasting domain, a strategic planning domain, a project management domain, a product management domain, and an engineering management domain. It should be appreciated that each domain may have separate functions and tasks to perform, and maintaining separate knowledge graphs for each domain can improve execution and performance of the tasks, e.g., by accessing a domain-specific knowledge graph utilizing an LLM that is fine-tuned for a particular domain.

Domain filter 120 is configured to determine whether a received data item is relevant to a particular domain. In some embodiments, system 100 includes a single domain filter 120 that is configured to determine one or more domains that are relevant for a given data item 110, and route the data item 110 to an information extractor 130 for the determined domains. In other embodiments, multiple systems 100 are implemented that each receive data items 110, and each system includes domain filter 120 for determining whether the data item is relevant to the receiving system 100. Provided the data item 110 is not relevant to a system 100, as determined at domain filter 120, the data item 110 is discarded for that instance of system 100. Provided the data item 110 is relevant to a system 100, as determined at domain filter 120, the data item 110 is forwarded to information extractor 130. It should be appreciated that data items 110 can be relevant to one or more domains, such as scheduling and planning, and that each domain-specific system 100 would process data items 110 that it receives from domain filter 120.

In some embodiments, domain filter 120 includes an LLM that is prompted to determine at least one topic of the data item and to determine whether the topic is relevant to a particular system 100. The LLM of domain filter 120 can base the topic determination on the data item 110, as well as other information that might be available (e.g., a thread to which data item 110 belongs). In some embodiments, the determination is augmented by training the LLM using a corpus of data items that include examples of domains to improve the accuracy of the determination, where the corpus of data items is pre-filtered and pre-selected, allowing for the fine tuning of the LLM to better identify domains. In some embodiments, the LLM can extract topics from data items 110 and sort them according to a domain.

Information extractor 130 receives data items 110 that are relevant to a particular domain, and processes them to extract information from data items 110 for use in populating knowledge graph 140. Information extractor 130 is configured to extract information related to the entities (e.g., participants) and topics of the data items 110. In some embodiments, a relationship between the entities is also determined, where the relationship identifies that the entities are in communication over the topic. For example, where a data item 110 is an email message, information extractor 130 determines the names of the sender and recipients and a topic of the email message, and any people or parties referenced in the email message. Continuing with the example, where the email message is intended to coordinate scheduling of a meeting, information extractor 130 would also determine the parties needed to participate in the meeting, the topic of the meeting, as well as any other relevant information needed for the meeting (e.g., an attached document to disseminate to participants).

Information extractor 130 is also configured to determine threads to which data items 110 are included within. For example, a thread can be a collection of electronic messages between two or more entities. For instance, a series of emails between two or more participants may be included in a thread, such as emails communicated for the purpose of scheduling a meeting. In some embodiments, a thread is determined using metadata within the body or payload of the data items 110. In other embodiments, a thread is determined by accessing an email server or other source messaging application for identifying messages related to data items 110. Information extractor 130 also determines a type of interaction for data items 110, based in part on the identified thread within which the data item is included. For example, in scheduling a meeting, a thread of data items may include, without limitation, the following types of interactions: introduction, suggest times, accept times, reject times, confirm meeting, cancel meeting, reschedule meeting, follow up on meeting, and other.

Figure 2:
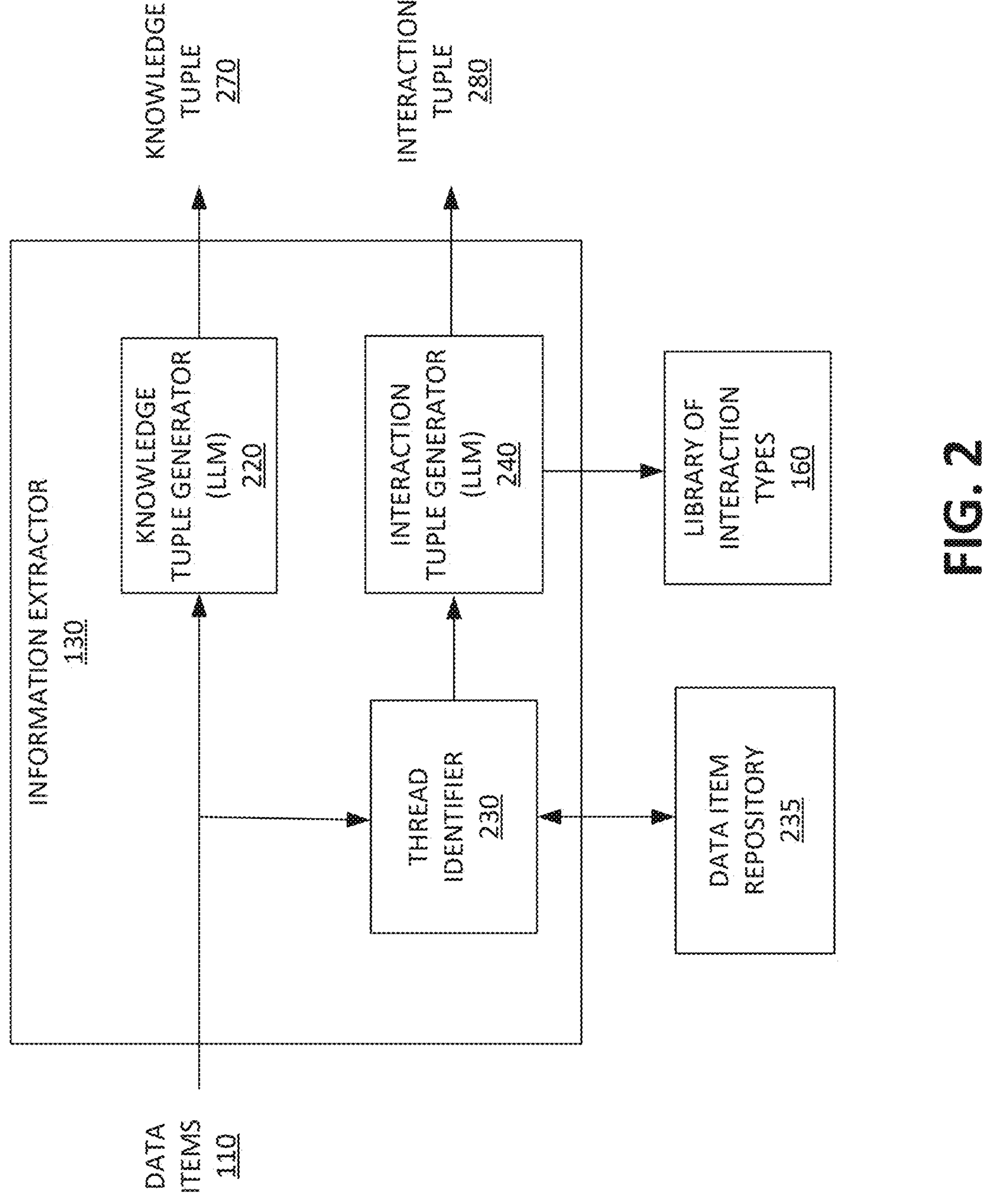
FIG. 2 is a block diagram illustrating an information extractor of a system for generating a knowledge graph including interaction information, in accordance with embodiments.

FIG. 2 is a block diagram illustrating an information extractor 130 of a system for generating a knowledge graph including interaction information, in accordance with embodiments. Information extractor 130 includes knowledge tuple generator 220, thread identifier 230, and interaction tuple generator 240. Data items 110 are received at information extractor 130, and routed to knowledge tuple generator 220 and thread identifier 230.

Knowledge tuple generator 220 is configured to extract information related to the entities (e.g., participants) and topics of the data items 110. In some embodiments, knowledge tuple generator is also configured to determine a relationship between the entities, where the relationship identifies that the entities are in communication over the topic. In some embodiments, knowledge tuple generator 220 includes an LLM capable of extracting information within data items 110 to generate knowledge tuples 270. In some embodiments, the knowledge tuple from each data item is generated at an LLM in response to prompting the LLM to extract the knowledge tuple information from the data item. A knowledge tuple 270 includes entities of the data item and a topic of the interaction of the data item. In some embodiments, knowledge tuple 270 also includes at least one relationship between the entities. In some embodiments, the LLM is fine-tuned to perform a specific type of operation.

For instance, where the domain of system 100 is scheduling, the LLM of knowledge tuple generator 220 is fine-tuned to extract information from the data items 110 that is relevant to scheduling. For example, where a data item 110 is an email message, the LLM of knowledge tuple generator 220 may extract the names of the sender and recipients, a topic of the email message, and any people or parties referenced in the email message, the parties needed to participate in the meeting, the topic of the meeting, as well as any other relevant information needed for the meeting (e.g., an attached document to disseminate to participants). Knowledge tuple 270 is generated based on the information extracted from the data items 110 by the LLM of knowledge tuple generator 220.

Thread identifier 230 also receives data items 110, and is configured to identify a thread to which a data item 110 belongs, where a thread includes connected data items 110. For example, a thread can be a collection of electronic messages between two or more entities. In some embodiments, thread identifier 230 determines a thread using metadata within the body or payload of the data items 110. In other embodiments, thread identifier 230 determines a thread by accessing an email server or other source messaging application for identifying messages related to data items 110. In some embodiments, thread identifier 230 accesses knowledge graph 140 in identifying related messages to determine to which thread a data item belongs. In some embodiments, thread identifier 230 accesses data item repository 235 which includes source data for data items 110. For example, data item repository 235 may be an email server or a calendar server where the original data item 110 resides, allowing for the retrieval of data items 110 for determining whether a data item 110 is part of a particular thread.

Interaction tuple generator 240 is configured to extract information related to interactions between entities (e.g., participants) of the data items 110. In some embodiments, interaction tuple generator 240 includes an LLM capable of classifying the information within data items 110 to generate interaction tuples 280. Interaction tuple 280 includes entities of the data item, the thread corresponding to the data item, and the type of interaction of the data item. In some embodiments, the LLM is fine-tuned to perform a specific type of classification. The LLM of interaction tuple generator accesses library of interaction types 170, which includes a list of node types of knowledge graph 140 that are relevant to the domain of knowledge graph 140.

For instance, where the domain of system 100 is scheduling, the LLM of interaction tuple generator 240 is fine-tuned to extract information from the data items 110 that is relevant to scheduling. For example, where a data item 110 is an email message, the LLM of interaction tuple generator 240 extracts the names of the sender and recipients, the thread to which data item 110 belongs (e.g., from thread identifier 230), and classifies the data item 110 according to the type of interaction. The LLM accesses library of interaction types 170 for the scheduling domain, which can include, without limitation, the following types of interactions: introduction, suggest times, accept times, reject times, confirm meeting, cancel meeting, reschedule meeting, follow up on meeting, and other.

Interaction tuple 280 is generated based on the information extracted from the data items 110 and according to the classifications made by the LLM of interaction tuple generator 240.

In accordance with various embodiments, LLMs are used to perform the extraction of information from the data items for generating the knowledge tuples at knowledge tuple generator 220 and for generating the interaction tuples at interaction tuple generator 240. In some embodiments, the LLMs are fine-tuned for performing the specific tasks of information extraction. For example, an LLM can be fine-tuned to extract the entities of the data item and a topic of the interaction of the data item in generating the knowledge tuple. Similarly, an LLM can be fine-tuned to extract the interaction information from the data item in generating the interaction tuple. In some embodiments, the LLMs are trained on a corpus of historical data items illustrative of the type of information extraction used for generating the knowledge tuple and the interaction tuple With reference to FIG. 1, knowledge graph 140 is populated with the knowledge tuple 270 and the interaction tuple 280 of each data item 110, where the knowledge graph 140 includes nodes associated with the entities, the topics, and the interactions, and where the nodes associated with interactions comprise the type of interaction and thread of the data item. The knowledge graph 140 with interaction information allows an agent 150 to search for contextual communication patterns for use in performing specified tasks. It should be appreciated that the described system may include multiple knowledge graphs, each associated with a particular domain. The domain-specific knowledge graphs are accessible for assisting in the performance of domain-specific tasks.

Figure 3:
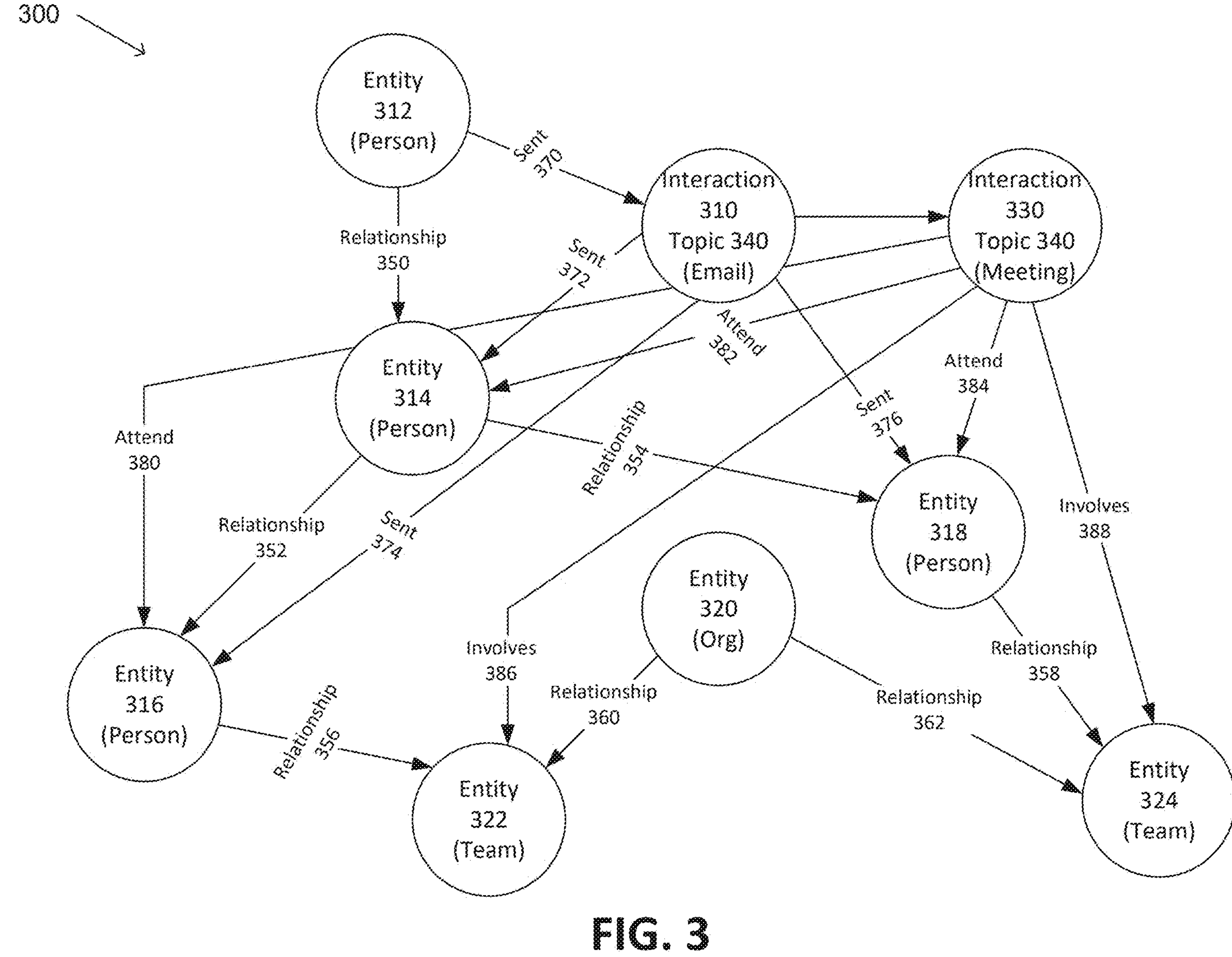
FIG. 3 is a diagram of an example knowledge graph, in accordance with embodiments.

FIG. 3 is a diagram of an example knowledge graph 300, in accordance with embodiments. Knowledge graph 300 includes nodes representing interactions 310 and 330 and nodes representing entities 312, 314, 316,318, 320, 322, and 324. It should be appreciated that knowledge graph 300 illustrates an example knowledge graph for interactions involving the scheduling of a meeting, and that a knowledge graph in accordance with the various embodiments described herein could include any number of interaction or entity nodes. It should be further appreciated that in accordance with some embodiments described herein, knowledge graph 300 may be a subgraph of a knowledge graph.

As illustrated, interaction 310 is an email communication involving topic 340 for scheduling a meeting (e.g., interaction 330) between the entities 314, 316, and 318, where the email communication was generated by entity 312, and where entities 312, 314, 316, and 318 represent persons. In some embodiments, interaction 310 includes an indication of a thread including interaction 310 (e.g., other email communications related to the scheduling of interaction 330 and/or entities involved in the scheduling of interaction 330). Topic 340 is the topic of the meeting of interaction 330.

Entity 320 represents an organization, where entities 322 and 324 represent teams within the organization. Edges 350, 352, 354, 356, 358, 360, and 362 represent relationships between the respective nodes. For example, edge 350 may indicate that entity 312 is a supervisor to entity 314 and edges 352 and 354 may indicate that entity 324 is a supervisor to entities 316 and 318, respectively. Edge 356 may indicate that entity 316 is a member of entity 322 and edge 358 may indicate the entity 318 is a member of entity 324 (e.g., edges that indicate that a person is a member of a team). Edges 360 and 362 may indicate that entities 322 and 324, respectively, are members of entity 320 (e.g., edges indicate that teams are members of an organization).

Edges of knowledge graph 300 can identify or link actions associated with the connected nodes. Edge 370 indicates that entity 312 is associated with an action of sending the email identified in interaction 310 involving topic 340, with edges 370, 372, and 374 indicating that entities 314, 316, and 318 were sent interaction 310. It should be appreciated that edges 372, 374, and 376 might also indicate that entities 314, 316, and 318, respectively, responded to interaction 310 and/or accepted a meeting invitation for interaction 330. Edges 380, 382, and 384 indicate that entities 314, 316, and 318, respectively, attended (or accepted an invitation to attend) interaction 330. Edges 386 and 388 indicate that interaction 330 involves entities 322 and 324, respectively.

With reference to FIG. 1, data items 110 are also received at agent 150. Agent 150 is configured to determine whether to automatically effectuate an action based on data item 110. For instance, agent 150 can be referred to as an "act or not" agent, in that agent 150 receives a data item 110 and determines whether or not to take or effectuate an action based on contents of data item 110. In some embodiments, as described above, a data item 110 is first processed at domain filter 120 prior to being received at agent 150. For example, agent 150 might only receive domain relevant data items 110, as determined at domain filter 120.

Data item 110 is evaluated at agent 150 to determine whether to automatically effectuate an action based on data item 110. In some embodiments, agent 150 is configured to evaluate data item 110 to determine an action to effectuate. For example, within the scheduling domain, data item 110 might be an email message including text indicating that scheduling of a meeting between two entities is intended. Agent 150 would then effectuate an action for the scheduling of such a meeting. In some embodiments, agent 150 is also configured to determine an appropriate second agent 160 for effectuating the action. Agents 160 are configured to effectuate specific actions.

Figure 4:
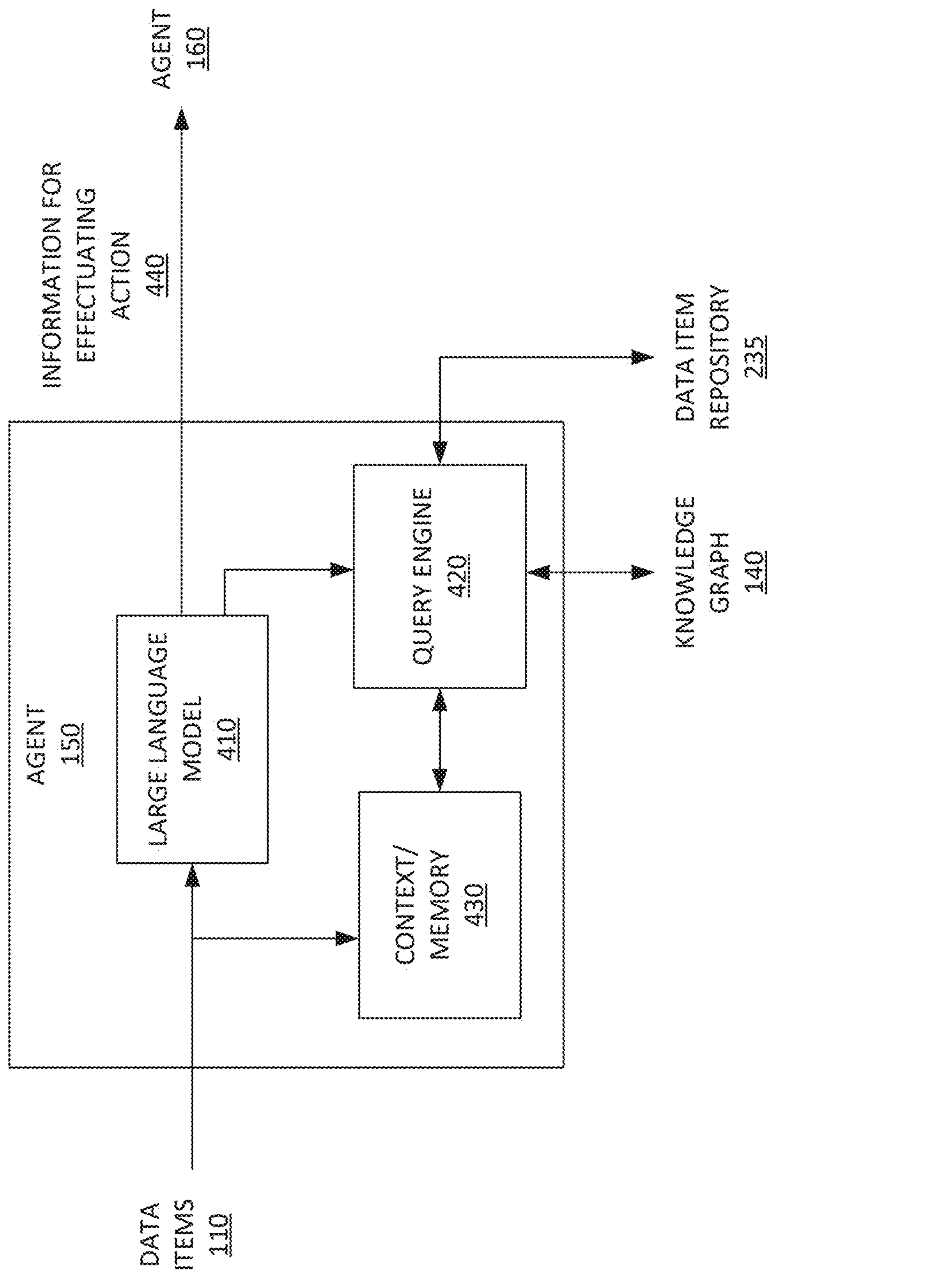
FIG. 4 is a block diagram illustrating an example agent for determining whether to effectuate an action based on a data item, in accordance with embodiments.

FIG. 4 is a block diagram illustrating an example agent 150 for determining whether to effectuate an action based on a data item, in accordance with embodiments. Agent 150 includes large language model (LLM) 410, query engine 420, and context/memory 430. Date items 110 are received at agent 150 and routed to LLM 410 and context/memory 430.

LLM 410 is configured to evaluate data items 110 and automatically effectuate actions by accessing knowledge graph 140. In some embodiments, LLM 410 is fine-tuned to perform the specific task (e.g., scheduling). Agent 150 receives an indication to perform a task. In some embodiments, agent 150 receives an overt command to perform the task, e.g., a request to schedule a meeting regarding a particular topic with a list of participants. In other embodiments, agent 150 receives data item 110 including a communication, parses data item 110, determines that an action should be taken, and determines a second agent 160 for effectuating the action. For example, agent 150 receives an email and identifies a need to schedule a meeting regarding a particular topic with a list of participants. Agent 150, using LLM 410, determines what information would be useful in effectuating the scheduling of the meeting, and generates a query at query engine 420 to knowledge graph 140 for the information.

For example, query engine 420 generates prompts to return information from the knowledge graph that identifies entities involved in the task, information about the process for performing the task for these entities, as well as data items (e.g., communications) related to performing the task. The information received from the knowledge graph, referred to as information 440 for effectuating action, is placed in a context/memory 430 that is exposed to LLM 410. In some embodiments, information 440 received includes subgraphs of knowledge graph 140, where a subgraph is indicative of a previous instance of performing the same or similar task. Agent 150, using LLM 410, can run any number of queries to retrieve the needed information from knowledge graph 140. In some embodiments, information 440 also includes, either directly or as links, data stored in data item repository 235 which includes source data for data items 110. As such, LLM 410 can retrieve any information 440 useful in effectuating an action identified by LLM 410.

Agent 150, also using LLM 410, identifies a second agent 160 (e.g., a scheduling agent) for effectuating the scheduling, forwards the retrieved information to agent 160, which automatically commences with scheduling such a meeting. In some embodiments, agent 150 may receive communication data items and determines whether an action needs to be effectuated (e.g., is the communication data item relevant to the domain of agent 150) and which agent 160 should be used to effectuate the action. For example, where the action to be effectuated is to schedule a meeting, the context/memory 430 could include information about how the participants have scheduled meetings in the past, how the enterprise has schedule meetings in the past, and information about the topic and participants of the meeting. Agent 150 communicates the information 440 retrieved from the knowledge graph 140 and forwards the information to the identified agent 160 for effectuating the task. It should be appreciated that there can be a plurality of agents 160 that are configured to effectuate different tasks or action. For example, agent 160 can be an agent for performing scheduling of a meeting, planning, coding, updating of documentation (e.g., standard operating procedures), etc.

Figure 5:
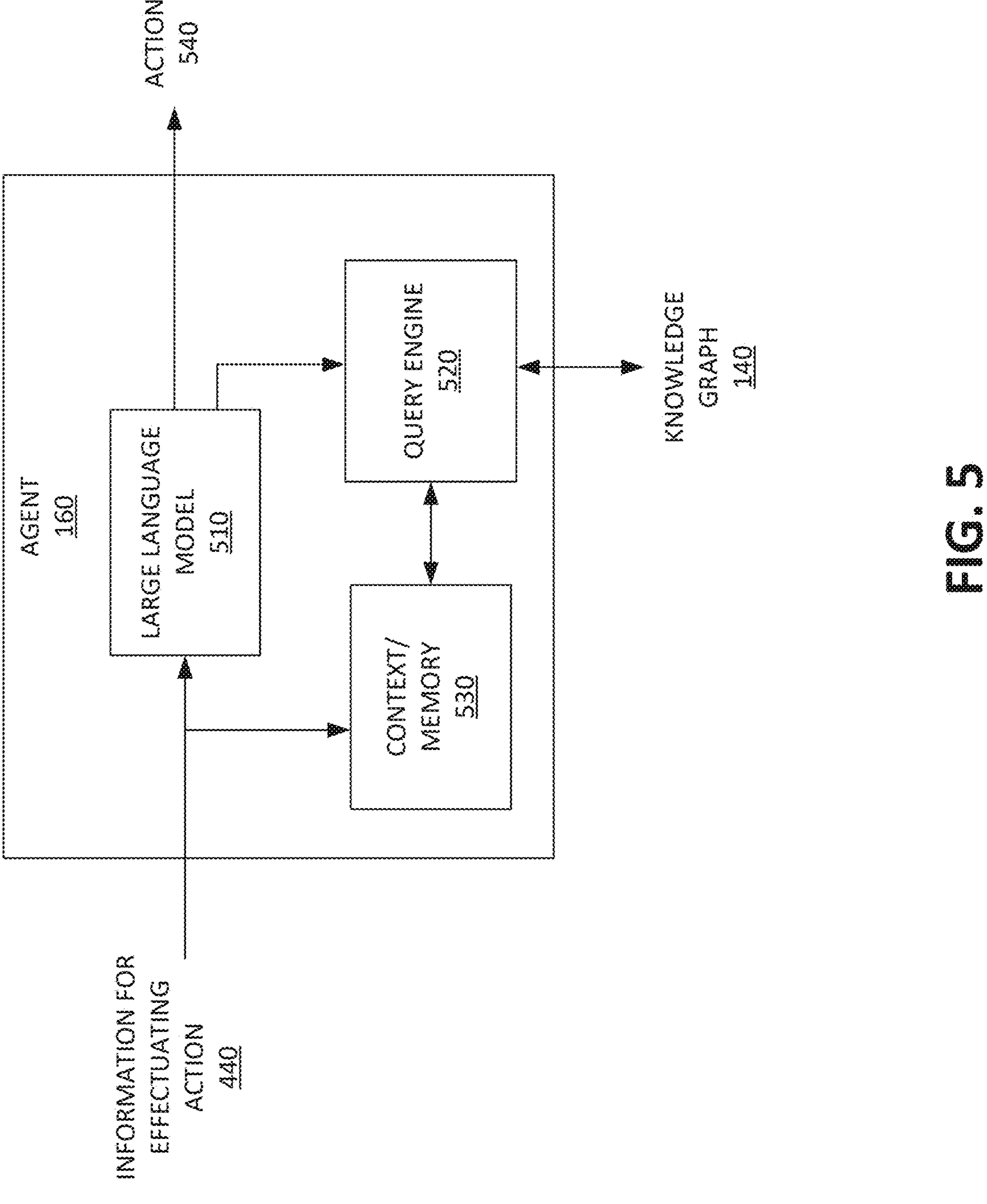
FIG. 5 is a block diagram illustrating an example agent for effectuating an action, in accordance with embodiments.

FIG. 5 is a block diagram illustrating an example agent 160 for effectuating an action 540, in accordance with embodiments. Agent 160 includes large language model (LLM) 510, query engine 520, and context/memory 530. Information 440 for effectuating action 540 is received at agent 160 and routed to LLM 510 and context/memory 530. In some embodiments, information 440 also includes data items 110, and/or links to data items 110 in data item repository 235 which includes source data for data items 110.

Agent 160 includes LLM 510 for effectuating the identified action 540. Agent 160 receives information 440 for effectuating action 540, which is placed in context/memory 530 that is exposed to LLM 510. LLM 510 is prompted by agent 160 to evaluate the information 440 received from agent 150 to determine what action 540 to effectuate and how to effectuate the action 540 (e.g., by utilizing a subgraph and/or example interactions identified by the knowledge graph 140). For example, where agent 160 is a scheduling agent, LLM 510 would then generate and communicate an email to the intended participants about scheduling a meeting, including a proposed time. Other information could also be provided, such as a document to be discussed in the meeting, an agenda of the meeting, etc., as indicated in the communications related to the scheduling of the meeting. Agent 150 would receive follow-up emails, e.g., as a data item 110, regarding the scheduling of the meeting, and iterate as necessary to schedule such a meeting.

In accordance with some embodiments, agent 160 is comprised within a graph of agents, wherein the graph of agents identifies multiple agents that collectively are available for evaluating the information received from agent 150 to determine the action 540 and for effectuating the action under control of agent 160. For instance, where agent 160 is dedicated to scheduling meetings, agent 160 might have access to a calendar of only one entity involved in the meeting. Agent 160 might identify a meeting time available to that entity, then engage another agent 160 (e.g., a messaging agent) for communicating (e.g., generating an email) with the other entity of the meeting to suggest the meeting time. In another example, where agent 160 has access to the calendars of all entities, agent 160 might find a mutually available time and set the meeting without needing to engage a messaging agent.

In some embodiments, agent 160, using LLM 510, determines that additional information 440 would be useful in effectuating the scheduling of the meeting, and generates a query at query engine 520 to knowledge graph 140 for the information. For example, query engine 520 generates prompts to return additional information 440 from knowledge graph 140. The additional information 440 received from knowledge graph 140 is placed in context/memory 530 that is exposed to LLM 510 for use in effectuating the action.

Figure 6:
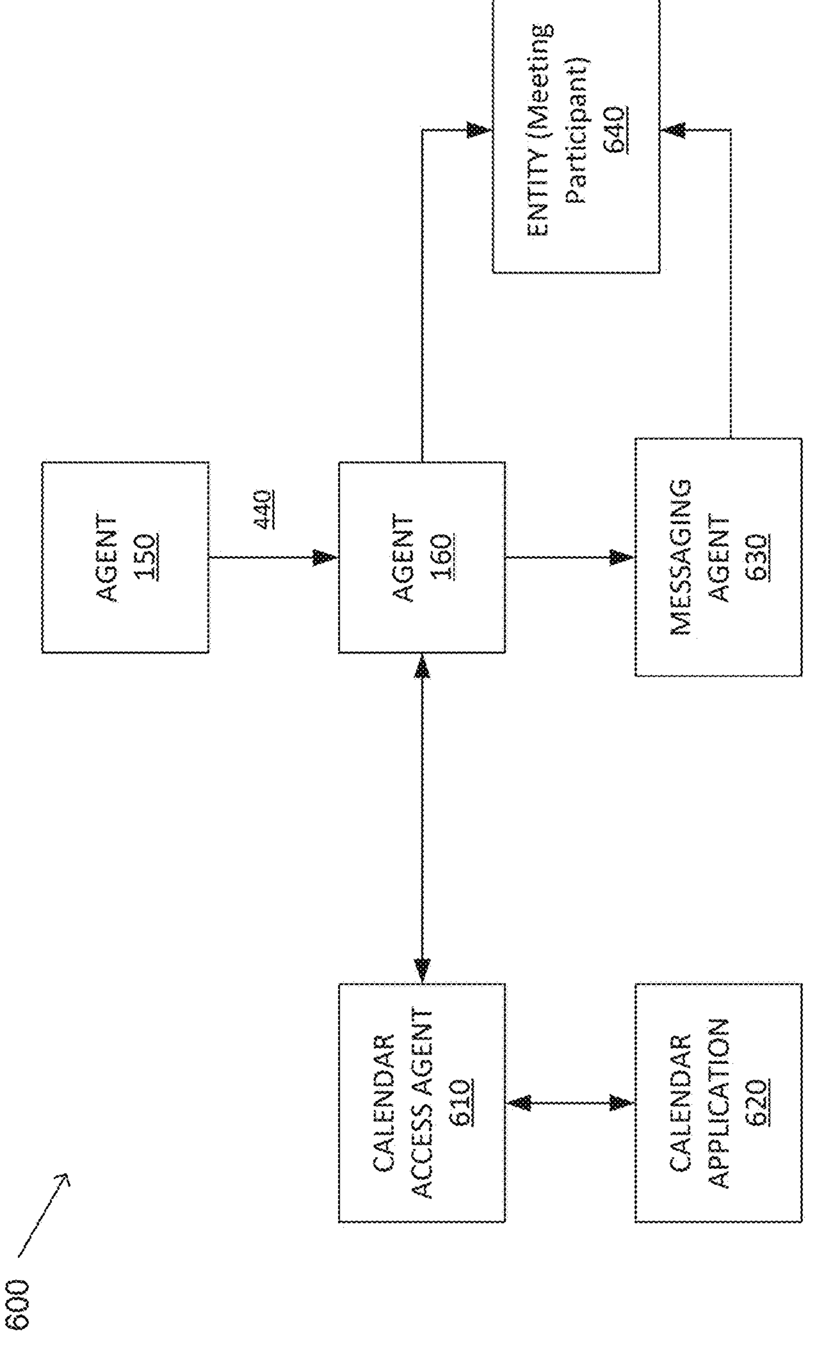
FIG. 6 is a block diagram of an example graph of agents, in accordance with embodiments.

FIG. 6 is a diagram of an example graph of agents 600, in accordance with embodiments. In accordance with some embodiments, agent 160 is comprised within a graph of agents 600, wherein the graph of agents 600 identifies multiple agents that collectively are available for evaluating the information received from agent 150 to determine the action and for effectuating the action under control of agent 160. For instance, where an agent 160 is dedicated to scheduling meetings, agent 160 might have access to a calendar of only one entity involved in the meeting. Agent 160 might identify a meeting time available to that entity, then engage another agent 160 (e.g., a messaging agent) for communicating (e.g., generating an email) with the other entity of the meeting to suggest the meeting time. In another example, where agent 160 has access to the calendars of all entities, agent 160 might find a mutually available time and set the meeting without needing to engage a messaging agent.

Graph of agents 600 includes agent 150, agent 160, calendar access agent 610, and messaging agent 630. In the illustrated example, agent 150 communicates information 440 for effectuating an action to agent 160, where agent 160 operates as a control/decision making agent for effectuating the action. Agent 160 communicates with calendar access agent 610, which has access to calendar application 620 used by at least one entity. Calendar access agent 610 accesses calendar application 620 to determine meeting time availability for at least one entity. Where information 440 includes a proposed meeting time, calendar access agent 610 determines whether the proposed meeting time is available and communicates the determination to agent 160. Where information 440 does not include a proposed meeting time, calendar access agent 610 identifies at least one proposed meeting time and communicates that to agent 160. Where calendar access agent 610 has access to calendar application 620 for multiple entities, calendar access agent 610 can schedule the meeting (tentatively or affirmatively) and communicate this to agent 160.

In some embodiments, agent 160, upon receiving calendar information from calendar access agent 620, communicates this calendar information to messaging agent 630. Messaging agent 630 communicates this calendar information to entity 640 (e.g., a meeting participant) to inform and/or confirm their availability and/or approval of the scheduling of the meeting. It should be appreciated that the particular information communicated to entity 640 is dependent on the amount of calendar access that is available to calendar access agent 610, as well as the information 440 provided by agent 150. For example, if information 440 includes a proposed meeting time and calendar access agent determines that the proposed meeting time is available for entity 640, messaging agent 630 can confirm the proposed meeting time to entity 640 or indicate that the proposed meeting time is available, allowing entity 640 to confirm prior to setting the meeting. In some embodiments, for example where calendar access agent 610 identifies that a proposed meeting time is available for entity 640, agent 160 may directly schedule the meeting without messaging entity 640.

Example Computer System

Figure 7:
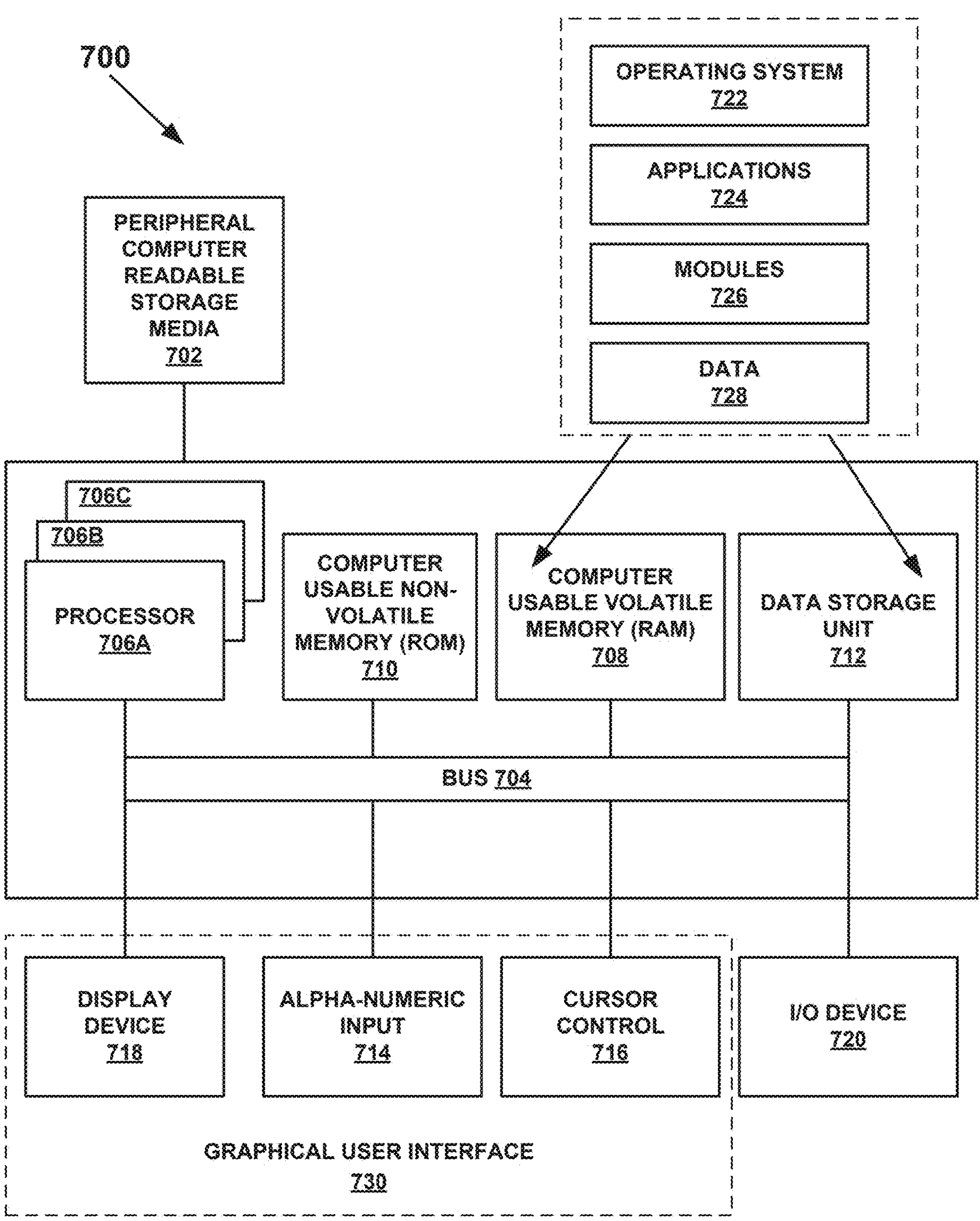
FIG. 7 is a block diagram of an example computer system upon which embodiments of the present invention can be implemented.

FIG. 7 is a block diagram of an example computer system 700 upon which embodiments of the present invention can be implemented. FIG. 7 illustrates one example of a type of computer system 700 (e.g., a computer system) that can be used in accordance with or to implement various embodiments which are discussed herein.

It is appreciated that computer system 700 of FIG. 7 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, standalone computer systems, media centers, handheld computer systems, multi-media devices, and the like. In some embodiments, computer system 700 of FIG. 7 is well adapted to having peripheral tangible computer-readable storage media 702 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 700 of FIG. 7 includes an address/data bus 704 for communicating information, and a processor 706A coupled with bus 704 for processing information and instructions. As depicted in FIG. 7, computer system 700 is also well suited to a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors. Computer system 700 also includes data storage features such as a computer usable volatile memory 708, e.g., random access memory (RAM), coupled with bus 704 for storing information and instructions for processors 706A, 706B, and 706C. Computer system 700 also includes computer usable non-volatile memory 710, e.g., read only memory (ROM), coupled with bus 704 for storing static information and instructions for processors 706A, 706B, and 706C. Also present in computer system 700 is a data storage unit 712 (e.g., a magnetic or optical disc and disc drive) coupled with bus 704 for storing information and instructions. Computer system 700 also includes an alphanumeric input device 714 including alphanumeric and function keys coupled with bus 704 for communicating information and command selections to processor 706A or processors 706A, 706B, and 706C. Computer system 700 also includes a cursor control device 716 coupled with bus 704 for communicating user input information and command selections to processor 706A or processors 706A, 706B, and 706C. In one embodiment, computer system 700 also includes a display device 718 coupled with bus 704 for displaying information.

Referring still to FIG. 7, display device 718 of FIG. 7 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, touch screen, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. Computer system 700 is also well suited to having a cursor directed by other means such as, for example, voice commands. In various embodiments, alphanumeric input device 714, cursor control device 716, and display device 718, or any combination thereof (e.g., user interface selection devices), may collectively operate to provide a graphical user interface (GUI) 730 under the direction of a processor (e.g., processor 706A or processors 706A, 706B, and 706C). GUI 730 allows user to interact with computer system 700 through graphical representations presented on display device 718 by interacting with alphanumeric input device 714 and/or cursor control device 716.

Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet. In one embodiment, I/O device 720 includes a transmitter. Computer system 700 may communicate with a network by transmitting data via I/O device 720.

Referring still to FIG. 7, various other components are depicted for computer system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Example Methods of Operation

Figure 8A:
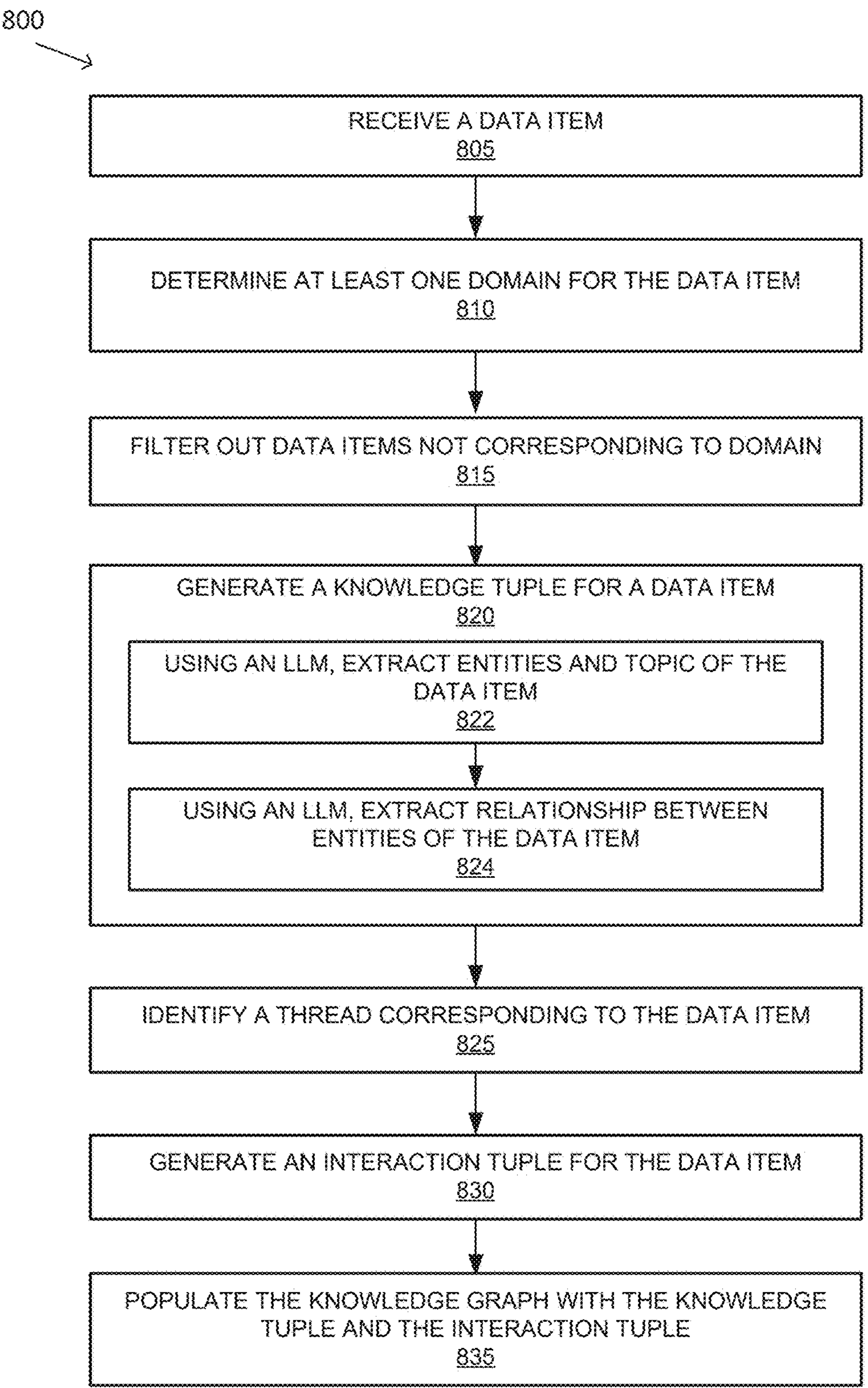
FIGS. 8A and 8B are flow diagrams of example operations for generating a knowledge graph of interaction information, according to various embodiments.
Figure 8B:
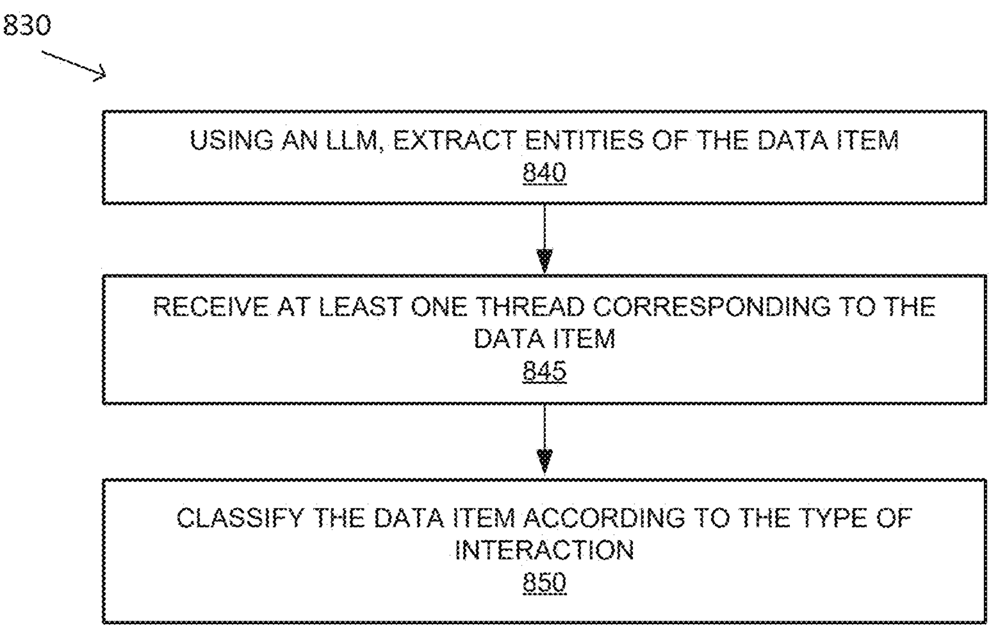
Figure 9:
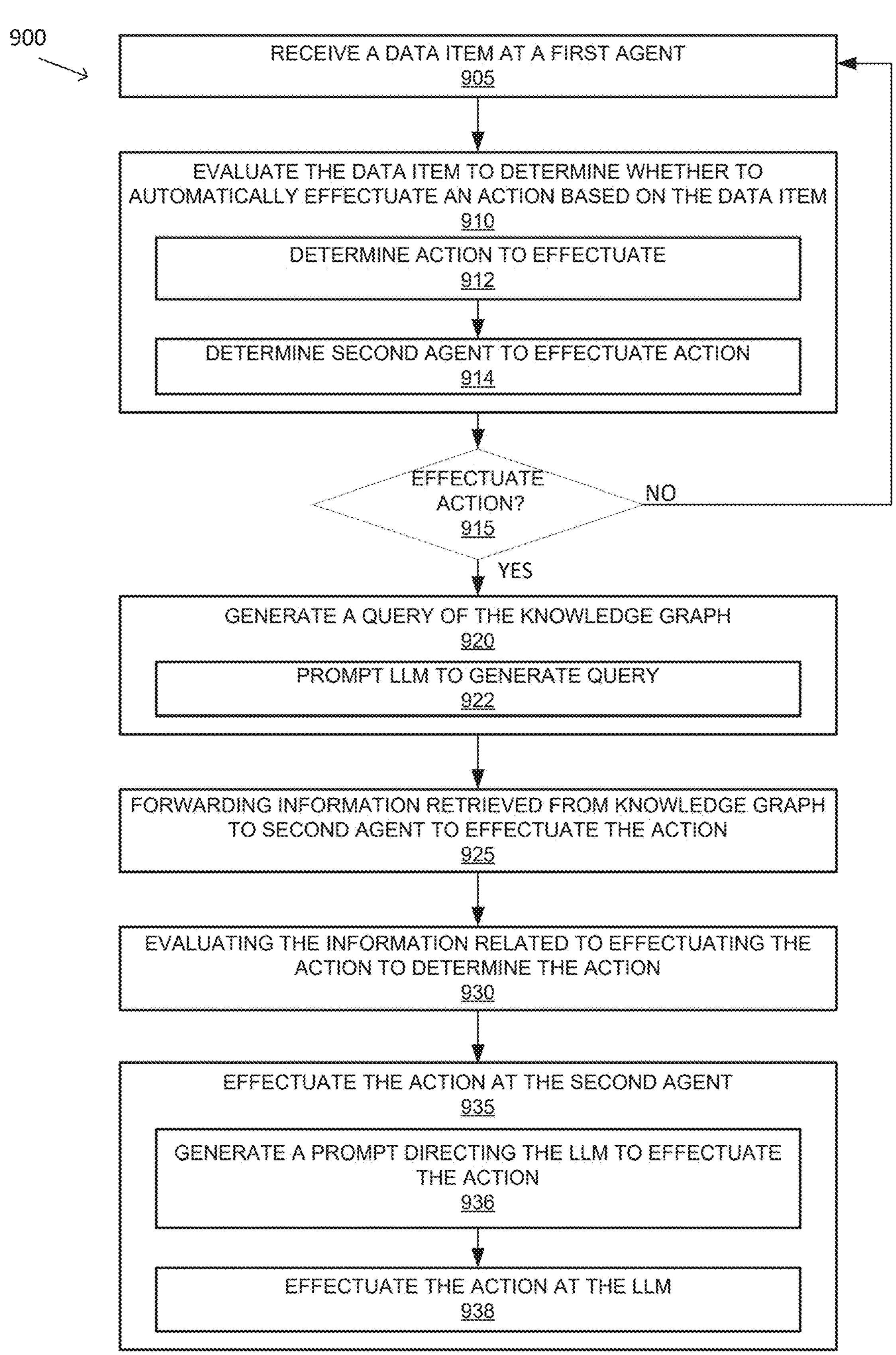
FIG. 9 is a flow diagram of example operations for automatically effectuating an action based on a data item, according to various embodiments.

The following discussion sets forth in detail the operation of some example methods of operation of embodiments. With reference to FIGS. 8A, 8B, and 9, flow diagrams 800, 830, and 900, illustrate example procedures used by various embodiments. The flow diagrams include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 700). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in the flow diagrams may be performed in an order different than presented and/or not all of the procedures described in the flow diagrams may be performed. It is further appreciated that procedures described in the flow diagrams may be implemented in hardware, or a combination of hardware with firmware and/or software provided by computer system 700.

FIGS. 8A and 8B are flow diagrams of example operations for generating a knowledge graph of interaction information, according to various embodiments. With reference to flow diagram 800 of FIG. 8A, at procedure 805, a data item including an interaction between at least two entities is received. In some embodiments, the interaction includes at least one of an electronic communication and a calendar event. In some embodiments, a plurality of data items including the data item is received at procedure 805. At procedure 810, at least one domain for the plurality of data items is determined. As shown at procedure 815, data items of the plurality of data items that do not correspond to the domain of the knowledge graph are filtered out, such that the data items not corresponding to the domain of the knowledge graph are disregarded. In some embodiments, the domain includes one of a scheduling domain, a sales domain, a planning domain, a forecasting domain, a strategic planning domain, a project management domain, a product management domain, and an engineering management domain.

At procedure 820, a knowledge tuple for the data item is generated, the knowledge tuple including entities of the data item and a topic of the interaction of the data item. In some embodiments, the knowledge tuple generated for the data item is generated at a first large language model. In some embodiments, as shown at procedure 822, the entities of the data item and the topic of the interaction of the data item are extracted at the first large language model. In some embodiments, as shown at procedure 824, at least one relationship between the entities is also extracted at the first large language model.

At procedure 825, at least one thread to which the data item corresponds is identified, wherein a thread includes connected data items. At procedure 830, an interaction tuple for the data item is generated, the interaction tuple including the entities of the data item, the thread corresponding to the data item, and a type of interaction of the data item.

In some embodiments, the interaction tuple for the data item is generated at a second large language model. In some embodiments, procedure 830 is performed according to the procedures of FIG. 8B. With reference to procedure 840 of FIG. 8B, the interaction tuple for the data item includes extracting the entities of the data item at the second large language model. As shown at procedure 845, the at least one thread to which the data item corresponds is received. At procedure 850, the data item is classified according to the type of interaction of the data item. In some embodiments, the type of interaction of the data item is also based on the thread to which the data item corresponds. In some embodiments, the type of interaction of the data item is selected from a library of interaction types. In some embodiments, the library of interaction types is based on a domain of the knowledge graph.

With reference to FIG. 8A, at procedure 835, the knowledge graph is populated with the knowledge tuple and the interaction tuple, the knowledge graph including nodes associated with the entities, the topics, and the interactions, wherein the nodes associated with interactions include the type of interaction and thread of the data item. In some embodiments, the knowledge graph is populated with a plurality of knowledge tuples and a plurality of interaction tuples corresponding to a domain.

FIG. 9 is a flow diagram 900 of example operations for automatically effectuating an action based on a data item, according to various embodiments. At procedure 905 of flow diagram 900, a data item is received at a first agent, wherein the data item includes an interaction between at least two entities, wherein the first agent is configured to determine whether to automatically effectuate an action based on the data item. In some embodiments, the data item includes an electronic communication between the at least two entities. At procedure 910, the data item is evaluated at the first agent to determine whether to automatically effectuate an action based on the data item. In some embodiments, evaluating the data item at the first agent to determine whether to automatically effectuate an action based on the data item includes determining the action to effectuate, as shown at procedure 912, and determining an appropriate second agent of a plurality of second agents for effectuating the action, as shown at procedure 914.

At procedure 915, it is determined whether to effectuate an action based on the data item. Provided the first agent determines that there is no action to effectuate, flow diagram 900 returns to procedure 905 for the next data item. Provided the first agent determines to automatically effectuate an action based on the data item, as shown at procedure 920, a query of a knowledge graph is generated at the first agent to retrieve information from the knowledge graph related to effectuating the action, wherein the knowledge graph includes a workflow database of historical interactions between entities. In some embodiments, the knowledge graph includes interaction information between a plurality of entities, the interaction information comprising a type of interaction for interactions between the plurality of entities and threads associated with the interactions between the plurality of entities, wherein a thread comprises connected interactions. In some embodiments, the first agent includes a large language model for determining whether to automatically effectuate an action based on the data item. In some embodiments, as shown at procedure 922, the generating the query at the first agent includes prompting the large language model to generate the query of the knowledge graph.

In some embodiments, the information from the knowledge graph related to effectuating the action includes at least one subgraph, wherein a subgraph is a pattern included of nodes and edges that includes a workflow for use in effectuating the action. In some embodiments, provided the information from the knowledge graph related to effectuating the action includes a plurality of subgraphs, the plurality of subgraphs is probabilistically collapsed into a probabilistic subgraph for use in effectuating the action.

At procedure 925, the information from the knowledge graph related to effectuating the action is forwarded to a second agent for effectuating the action. At procedure 930, at least the information related to effectuating the action is evaluated at the second agent to determine the action. At procedure 935, the action is effectuated at the second agent. In some embodiments, the second agent includes a large language model for evaluating at least the information related to effectuating the action to determine the action. In some embodiments, the second agent is included within a graph of agents, wherein the graph of agents collectively are available for evaluating at least the information related to effectuating the action to determine the action and for effectuating the action under control of the second agent.

In some embodiments, provided the second agent determines that additional information from the knowledge graph is required to evaluate the information related to effectuating the action to determine the action, a second query of the knowledge graph is generated at the second agent to retrieve the additional information from the knowledge graph related to effectuating the action. In some embodiments, effectuating the action includes generating a prompt based at least on the information related to effectuating the action directing the large language model to effectuate the action, as shown at procedure 936, and effectuating the action at the large language model, as shown at procedure 938.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for generating a knowledge graph of interaction information, the method comprising:

receiving a data item comprising an interaction between at least two entities;

generating a knowledge tuple for the data item, the knowledge tuple comprising entities of the data item and a topic of the interaction of the data item, wherein the knowledge tuple generated for the data item is generated at a large language model, wherein the generating the knowledge tuple for the data item comprises:

extracting, at the large language model, the entities of the data item and the topic of the interaction of the data item; and extracting, at the large language model, at least one relationship between the entities;

identifying at least one thread to which the data item corresponds, wherein a thread comprises connected data items;

generating an interaction tuple for the data item, the interaction tuple comprising the entities of the data item, the thread corresponding to the data item, and a type of interaction of the data item; and populating the knowledge graph the knowledge tuple and the interaction tuple, the knowledge graph comprising nodes associated with the entities, the topics, and the interactions, wherein the nodes associated with interactions comprise the type of interaction and thread of the data item.

2. The method of claim 1, wherein the interaction tuple for the data item is generated at a large language model.

3. The method of claim 2, wherein the generating the interaction tuple for the data item comprises:

extracting, at the large language model, the entities of the data item;

receiving the at least one thread to which the data item corresponds; and classifying the data item according to the type of interaction of the data item.

4. The method of claim 3, wherein the type of interaction of the data item is also based on the thread to which the data item corresponds.

5. The method of claim 1, wherein the interaction comprises at least one of an electronic communication and a calendar event.

6. The method of claim 1, wherein the type of interaction of the data item is selected from a library of interaction types.

7. The method of claim 6, wherein the library of interaction types is based on a domain of the knowledge graph.

8. The method of claim 1, wherein the knowledge graph is populated with a plurality of knowledge tuples and a plurality of interaction tuples corresponding to a domain.

9. The method of claim 8, further comprising:

receiving a plurality of data items comprising the data item;

determining at least one domain for the plurality of data items; and filtering out data items of the plurality of data items that do not correspond to the domain of the knowledge graph, such that the data items not corresponding to the domain of the knowledge graph are disregarded.

10. The method of claim 8, wherein the domain comprises one of a scheduling domain, a sales domain, a planning domain, a forecasting domain, a strategic planning domain, a project management domain, a product management domain, and an engineering management domain.

11. A non-transitory computer readable storage medium having computer readable program code stored thereon for causing a computer system to perform a method for generating a knowledge graph of interaction information, the method comprising:

receiving a data item comprising an interaction between at least two entities;

generating, at a first large language model, a knowledge tuple for the data item, the knowledge tuple comprising entities of the data item and a topic of the interaction of the data item, wherein the generating the knowledge tuple for the data item comprises:

extracting, at the first large language model, the entities of the data item and the topic of the interaction of the data item; and extracting, at the first large language model, at least one relationship between the entities;

identifying at least one thread to which the data item corresponds, wherein a thread comprises connected data items;

generating, at a second large language model, an interaction tuple for the data item, the interaction tuple comprising the entities of the data item, the thread corresponding to the data item, and a type of interaction of the data item; and populating the knowledge graph the knowledge tuple and the interaction tuple, the knowledge graph comprising nodes associated with the entities, the topics, and the interactions, wherein the nodes associated with interactions comprise the type of interaction and thread of the data item.

12. The computer readable storage medium of claim 11, wherein the type of interaction of the data item is also based on the thread to which the data item corresponds, and wherein the type of interaction of the data item is selected from a library of interaction types.

13. The computer readable storage medium of claim 12, wherein the library of interaction types is based on a domain of the knowledge graph.

14. The computer readable storage medium of claim 11, the method further comprising:

receiving a plurality of data items comprising the data item;

determining at least one domain for the plurality of data items; and filtering out data items of the plurality of data items that do not correspond to the domain of the knowledge graph, such that the data items not corresponding to the domain of the knowledge graph are disregarded.

15. A computer-implemented method for generating a knowledge graph of interaction information, the method comprising:

receiving a plurality of data items comprising a data item, wherein the data item of the plurality of data items comprises an interaction between at least two entities;

determining at least one domain for the data item;

provided the at least one domain for the data item corresponds to a domain of a knowledge graph:

generating, at a first large language model, a knowledge tuple for the data item, the knowledge tuple comprising entities of the data item and a topic of the interaction of the data item;

identifying at least one thread to which the data item corresponds, wherein a thread comprises connected data items;

generating, at a second large language model, an interaction tuple for the data item, the interaction tuple comprising the entities of the data item, the thread corresponding to the data item, and a type of interaction of the data item, wherein the type of interaction of the data item is selected from a library of interaction types, and, wherein the library of interaction types is based on a domain of the knowledge graph; and populating the knowledge graph the knowledge tuple and the interaction tuple, the knowledge graph comprising nodes associated with the entities, the topics, and the interactions, wherein the nodes associated with interactions comprise the type of interaction and thread of the data item, and wherein the knowledge graph is populated with a plurality of knowledge tuples and a plurality of interaction tuples corresponding to a domain.

* * * * *